H. CLARKE.
Combination Locks.
No. 5,497. Reissued July 22, 1873.
FIG. I.
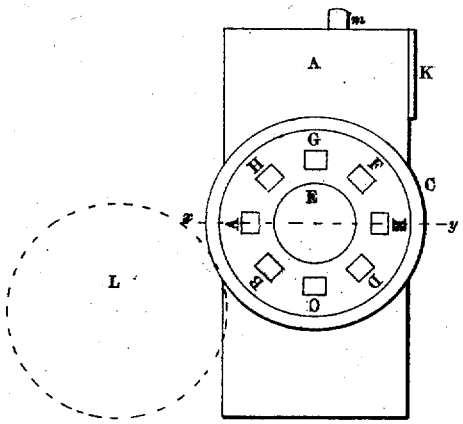
FIG. IV.
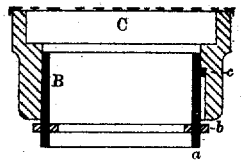
FIG. II.
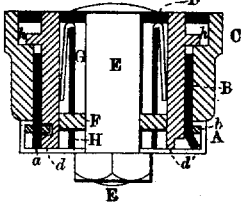
FIG. V.
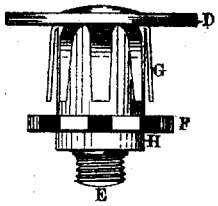
FIG. VI.
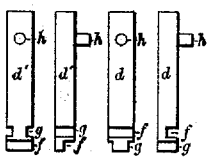
FIG. III.
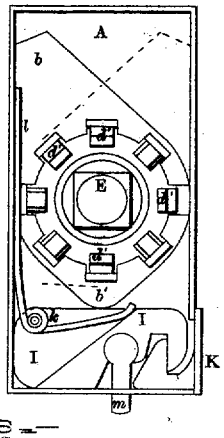
FIG. VII.
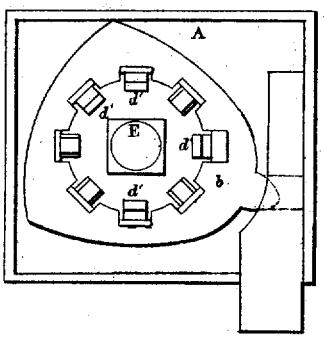
WITNESSES.
Edward A. Lagg, Jr.
H. A. Daniels
INVENTOR.
Henry Clarke,
by G. H. & W. J. Howard,
attys.
AM. PHOTO-LITHOGRAPHIC CO. N.Y. (OSBORNE'S PROCESS.)

UNITED STATES PATENT OFFICE.

HENRY CLARKE, OF BALTIMORE, MD., ASSIGNOR, BY MESNE ASSIGNMENTS, TO THE CLARKE LOCK COMPANY, OF LOUISVILLE, KY.

IMPROVEMENT IN COMBINATION LOCKS.

Specification forming part of Letters Patent No. 135,523, dated February 4, 1873; reissue No. 5,497, dated July 22, 1873; application filed July 1, 1873.

*To all whom it may concern:*

Be it known that I, HENRY CLARKE, of the city of Baltimore and State of Maryland, have invented certain Improvements in Combination Locks, of which the following is a specification; and I do hereby declare that in the same is contained a full, clear, and exact description of my said invention, reference being had to the accompanying drawing and to the letters of reference marked thereon.

My invention relates to locks so constructed that a key is not necessary, and that certain parts must be placed in some relative position, or a combination formed of certain parts, to allow the movement of the devices by means of which the locking and unlocking are accomplished. The invention consists, primarily, in a keyless lock, in which slotted tumblers, arranged in an annular inclosure within the lock, and capable of only a sliding movement, are elevated by the pulling outward of an exterior band, certain of the tumblers constituting a known combination, being adapted to be pushed back by the fingers to their original position, bringing them to such position with relation to an eccentrically-formed plate that certain teeth thereon can pass through slots in the depressed tumblers, and allow of the movement of the said plate, and the shooting out or in of the bolt, or the releasing of the spring-catch. The movement of the eccentrically-formed plate is allowed, and the shooting out of the bolt caused, or the releasing of the spring-catch made admissible, by the rotary movement of the exterior band, consequent upon the relative arrangement of the tumblers and said plate. My invention consists in the application to the lock-case of the eccentrically-formed toothed plate secured to and at a right angle with a sleeve, within which the tumblers are placed, the said tumblers being supported by an upper disk, through which they pass, and a lower annular plate bearing against their inside surfaces, and operated by means of the movable band fitted to the exterior of the said sleeve, which band, when raised, so operates certain of the tumblers, and brings them into such position with reference to the said eccentrically-formed plate, that the latter, at first locked by the tumblers, is made to partially revolve, admitting of the disengagement of the fastening devices of the lock. My invention further consists in means adapted whereby the upper disk is steadily secured to the lock-case, and to a device or combination of devices whereby the tumblers are forced laterally against the interior surface of the sleeve aforementioned, and wear of the operative parts provided for; and my invention lastly consists in an arrangement of devices whereby a spring-hook pivoted within the lock-case and held by the eccentrically-formed plate, so as to interlock with a catch separate from the lock, is adapted to be disengaged from the said catch when, by means of the joint operation of the tumblers and the said eccentrically-formed plate, the latter is moved from contact with the said spring-hook.

In the accompanying drawing, forming a part of this specification, Figure 1 is a front or face view of my improved combination lock. Fig. 2 is a cross-section of the same upon line *x y*. Fig. 3 is a view of the under side of the lock, the lower plate being removed. Figs. 4, 5, and 6 are views of detached parts of the invention; and Fig. 7, a modification of the same.

Similar letters of reference indicate similar parts of the invention in all the figures.

A represents the case or outside covering of the lock. B is a sleeve passing through the upper plate of the case. The lower edge of the sleeve is toothed, the teeth, represented by *a*, fitting within spaces existing between similar teeth formed within a horizontal plate, *b*, the office of which will be hereinafter fully explained. One or more of the teeth on the sleeve are turned outwardly where they project below the plate *b*, for the purpose of fastening the plate and sleeve together. C is an ornamental band placed upon the outside of the sleeve B, and is secured from turning upon the sleeve by means of the projecting stop *c* and the slot within which it is inserted. This stop, while preventing any lateral movement of the band independently of the sleeve, does not interfere with the longitudinal motion of the said band, as the slot in which the stop rests extends to the lower edge of the band. D is a disk situated within the band C at the outer end of the same, and is provided with a suitable number of perforations, in which the tumblers *d* and *d'* rest. E is a shaft passing through the disk D, securing it to the back plate of the case A. The shaft E may be lengthened so as to form a convenient method of fastening the lock to the drawer or trunk. F is a circular plate placed upon the shaft E as a bearing for the ends of tumblers *d d'*, and has notches in the edge for that purpose. G is a spring formed by cutting one end of a sheet-metal cylinder into tapering strips equal in number to that of the tumblers *d d'*, and bending the strips downward so as to bring their ends nearly to the circular plate F. The purpose of this spring is to give sufficient friction to the tumblers *d d'*, to prevent their too ready movement, and also to provide for any wear of the tumblers or adjacent parts. H is a washer occupying the space between the plate F and the back plate of the case A. The tumblers *d* are provided with grooves *f*, which are of such depth and at such distance from the disk D as to allow the teeth in the plate *b* to pass without coming in contact with said tumblers when in their lowest position. The tumblers *d'* have the grooves *f* at a greater distance from the disk, thereby requiring the tumblers to be raised a certain height to bring the grooves in a line with the horizontal plate *b* and allow the passage of the teeth on the plate past the tumblers through their respective grooves. The tumblers are each provided with false notches *g*. The purpose of these notches is to mislead any one endeavoring to discover the relative positions to which the tumblers *d* and *d'* must be brought to admit of the rotary motion of the plate *b*, sleeve B, and band C. The tumblers *d d'* are provided with the pins *h*, which engage a projecting portion of the interior of the band C. These pins serve as means by which the tumblers are moved as the band C is raised above the disk D. I is a hook pivoted at *k*, and furnished with the spring *l* and thumb-piece *m*. K is a catch secured to the lid or door of the trunk or other object to which this locking device is applied. The catch passes through an opening in the case A, and is caught by the hook I. The plate *b* has a projection, *b'*, on the side next to the hook I, which projection, when in the position shown in Fig. 3 of the drawing, comes in contact with the hook, keeping it from a too far backward movement, by reason of which its disengagement from the catch might occur. To provide sufficient space for the movement of the hook I the plate must be moved into the position shown by the dotted lines. The movement of the plate *b* is checked by its coming in contact with the sides of the case A.

Supposing the different parts of the lock to be in the positions shown in Figs. 2 and 3 of the drawing, wherein the device is represented as being locked, and it is desired to unlock it, the operation is as follows: The band C is raised above the disk D, carrying the ends of the tumblers *d* and *d'* through the disk. The band is then replaced, leaving the tumblers protruding. The tumblers *d*, which are also represented in Fig. 1 by the letters A, D, F, and H, are then forced into their original positions, bringing the grooves *f* opposite the teeth on the plate *b*, the grooves in the tumbler *d'*, represented by B, C, E, and G, being already in that position. The band C, with the connecting parts, is now free to turn until the plate *b* is brought to the position indicated in Fig. 3 by the dotted lines. The projection *b'* upon the plate *b* is thus removed from contact with the surface of the hook I, which can now be moved by the pressure of the thumb upon the piece *m*, so as to release the catch K. A lid, L, is arranged, as shown in Fig. 1, to cover the disk D and ornamental band C, and to slide back upon a pivot after the manner of the ordinary sliding cover to some key-holes. In Fig. 4, the cover is shown slipped over the band C. The use of either lid is to protect the parts of the lock covered from damage by blows, and to keep them clean and free from dust.

The arrangement of this lock can be altered to suit the different objects to which it may be applied. For instance, the plate *b* may be immediately connected with a bolt corresponding with the bolt of an ordinary lock, as shown in Fig. 7; or other modifications in shape and construction may be made, the principle herein shown remaining unchanged.

A person unacquainted with the combination of tumblers necessary to be forced to their original positions after the entire number have been raised, would be unable to unlock the device.

It is at once apparent that this lock is applicable to trunks, valises, desks, or any other object or place whereto locks are usually applied, and free from the objection which can be urged against ordinary locks, namely, that they have keys which can be misplaced or lost.

Having thus described my invention, what I claim as new, and wish to secure by Letters Patent of the United States, is—

1. A keyless lock in which slotted tumblers, arranged in an annular inclosure within the lock and capable of only a sliding movement, are elevated by the pulling outward of an exterior band, C, certain of the tumblers constituting a known combination being adapted to be pushed back to their original place, bringing them to such position with relation to the eccentrically-formed plate that certain teeth thereon can pass through slots in the depressed tumblers, and allow of the movement of the said plate, and the shooting out or in of the bolt, or the releasing of the spring-hook, as set forth.

2. The movable eccentrically-formed toothed plate *b b'*, sleeve B, tumblers *d d'*, and case A, relatively arranged substantially as herein described, for the purpose specified.

3. The case A and bolt E, in combination with the sleeve B, band C, disk D, and tumblers *d d'* having the pins *h*, substantially as and for the purpose herein set forth.

4. In combination with the tumblers *d d'*, the spring G, disk D, circular plate F, and washer H, substantially as herein shown, for the purpose specified.

5. The spring hook I *m*, pivoted within the case at *k*, and catch K, in combination with the plate *b b'*, adapted to be made stationary or movable by means of the tumblers *d d'* operating with it, substantially as herein set forth.

In testimony whereof I have hereto subscribed my name, in the city of Washington, District of Columbia, this 27th day of June, A. D. 1873.

HENRY CLARKE.

Witnesses:
W. F. BEASLEY,
GEORGE H. HOWARD.